J. Sawyer,
Bench Dog,

№ 10,579. Patented Feb. 28, 1854.

UNITED STATES PATENT OFFICE.

JOS. SAWYER, OF SOUTH ROYALSTON, MASSACHUSETTS.

SOCKET FOR BENCH-HOOKS.

Specification of Letters Patent No. 10,579, dated February 28, 1854.

*To all whom it may concern:*

Be it known that I, JOSEPH SAWYER, of South Royalston, in the county of Worcester and State of Massachusetts, have invented a new and useful Improvement in Bench-Hooks for Carpenters' Use; and I hereby declare the following to be a full, clear, and exact description of the same, reference being had to the annexed drawings, making part of this specification, in which—

Figure 1:
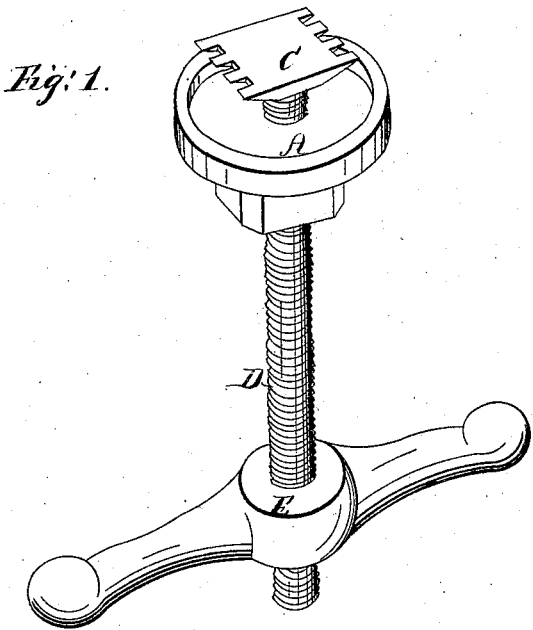
Figure 2:
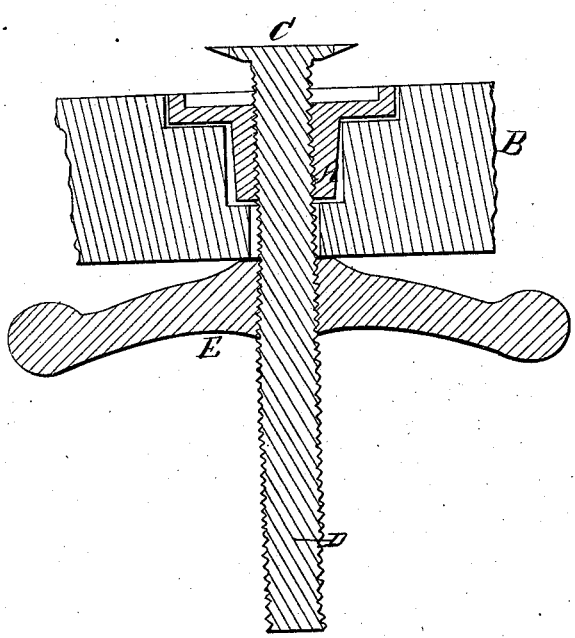

Figure 1 is a perspective view of the bench hook—Fig. 2 a section through the same as secured to the bench.

The nature of my invention consists in securing the socket of the bench hook to the bench, by the same nut and screw which are employed to secure the hook to the socket; heretofore two screws and two nuts having been employed for the purpose.

A is the socket which is sunk below the surface of the bench B as represented in Fig. 2.

C is the hook upon the shank of which is cut the screw D. This screw works in a corresponding female in the socket A, which is made much shorter than usual so as not to penetrate through the bench. By turning the hook C it is easily elevated or depressed within the socket.

E is a nut which works upon the screw D by means of which the hook is secured to the socket and the socket to the bench.

I am aware that bench hooks have been constructed in which the socket has extended entirely through the bench, and has been furnished with a screw at its lower extremity upon which worked a nut for the purpose of securing it to the bench, an additional screw and nut being required upon the shank for the purpose of securing the hook to the socket. This was more complicated and expensive than the arrangement which I have adopted, and I lay claim to no such device, but What I do claim as my invention and desire to secure by Letters Patent is—

The above described improvement in the sockets of bench hooks, the hook being secured to the socket by the same screw and nut which fasten the whole to the bench.

JOSEPH SAWYER.

Witnesses:
SAM COOPER,
EDWIN LEE BROWN.